3,513,186
ORTHO-HALOATROPONITRILES
Jerome G. Kuderna, Jr., Modesto, Calif., assignor to Shell Oil Company, New York, N.Y., a corporation of Delaware
No Drawing. Filed Oct. 16, 1967, Ser. No. 675,297
Int. Cl. A01n 9/20; C07c 103/22, 121/70
U.S. Cl. 260—465    10 Claims

ABSTRACT OF THE DISCLOSURE

Ortho-haloatroponitriles, such as 2,5-dichloroatroponitrile, are useful as herbicides and/or microbicides.

Field of the invention

This invention relates to atroponitriles. More particularly the invention relates to ortho-haloatroponitriles.

DESCRIPTION OF THE PRIOR ART

Atroponitrile (alpha-cyanostyrene) and p-chloroatroponitrile (p-chloro-alpha-cyanostyrene) are known compounds. Both compounds are polymerizable monomers as disclosed in U.S. 2,444,870.

SUMMARY OF THE INVENTION

It has now been found that atroponitriles substituted at at least one ortho position by halogen have useful biological properties. The compounds are described by the formula

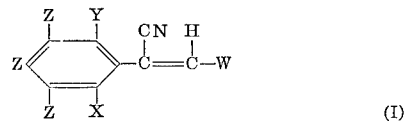

wherein W is hydrogen or halogen, X is halogen, Y is hydrogen or halogen, and each Z, which may be the same or different, is hydrogen, halogen or nitro with the proviso that when Y is halogen, W is hydrogen.

When the compounds of Formula I are halogen substituted in the beta position, i.e., W is halogen, they can have either of two stereoisomeric configurations, i.e., the cis or trans structure. For the purposes of this invention, the cyano moiety has been selected as the reference substituent; the isomer in which the cyano and halogen lie on the same side of the double bond is designated as the cis configuration. The trans configuration, therefore, is the isomer in which the cyano and halogen lie on opposite sides of the double bond.

While Formula I is not written to represent the isomeric configuration (both forms as well as mixtures are understood to be included in the present invention. The isomeric configuration does not appear to have a great effect upon the biological activity of these compounds.

An examination of Formula I indicates that the benzene ring must be substituted by at least one halogen atom in the ortho position. The compounds may contain 1–4 additional halogen atoms by way of the 3-, 4-, 5- or 6-positions. Furthermore, the 3-, 4- and 5-positions may be substituted by 1–3 nitro groups.

The alpha-cyanovinyl side chain may also be monohalo-substituted in the beta-position when Y is hydrogen. Thus, the ortho-haloatroponitriles of the invention are substituted by from 1–5 halogen atoms and from 0–3 nitro groups.

Typical ortho-monohalo ring-substituted atroponitriles of the invention are 2-fluoroatroponitrile, 2-chloroatroponitrile, 2-iodoatroponitrile, beta,2-dichloroatroponitrile, beta,2-dibromoatroponitrile and the like.

The dihalo-ring-substituted ortho-haloatroponitriles include 2,3-dibromoatroponitrile, 2,4-difluoroatroponitrile, 2,5-dichloroatroponitrile, 2,6-dichloroatroponitrile, and their beta-halogen substituted counterparts such as beta,2,3 - tribromoatroponitrile, beta,2,5-trichloroatroponitrile and the like.

Representative trihalo ring-substituted ortho-haloatroponitriles are 2,3,4-trifluoroatroponitrile, 2,3,5-trichloroatroponitrile, 2,4,6-triodoatroponitrile, 2,3,6-trichloroatroponitrile, and their beta-halogen substituted counterparts such as beta,2,3,4 - tetrachloroatroponitrile, beta, 2,3,5-tetrachloroatroponitrile, beta,2,3,5-tetrafluoroatroponitrile and the like.

Typical tetra- and pentahalo ring-substituted ortho-haloatroponitriles includes 2,3,4,6-tetrabromoatroponitrile, 2,3,5,6-tetrabromoatroponitrile, 2,3,4,5,6-pentachloroatroponitrile and their beta-halogen substituted counterparts such as beta,2,3,4,5-pentachloroatroponitrile and the like.

Since ortho-haloatroponitriles of the invention also include those with nitro groups substituted in the 3-, 4- and 5-position, typical mono-nitro ring-substiuted ortho-haloatroponitrile include 2-bromo-3-nitroatroponitrile, 2,3-dichloro - 5 - nitroatroponitrile, 2,6-difluoro-4-nitroatroponitrile, 2,3,4 - tribromo-5-nitroatroponitrile, 2,4,6-triiodo-3 - nitroatroponitrile, 2,3,5,6 - tetrachloro-4-nitroatroponitrile and their beta-halogen substituted derivatives such as beta,2-dibromo-3-nitroatroponitrile, beta,2,5-trichloro-4 - nitroatroponitrile, beta,2,4,5-tetrafluoro-3-nitroatroponitrile and the like.

Representative dinitro ring-substituted ortho-haloatroponitriles are 2-chloro-3,4-dinitroatroponitrile, 2-bromo - 3,5 - dinitroatroponitrile, 2,3-diiodo-4,5-dinitroatroponitrile, 2,6-dichloro-3,5-dinitroatroponitrile, 2,5,6-tribromo-3,4-dinitroatroponitrile and their beta-halogen substituted counterparts such as beta,2-dichloro-3,4-dinitroatroponitrile, beta, 2,4-trichloro - 3,5 - dinitroatroponitrile, beta,2,5-tribromo-3,4-dinitroatroponitrile and the like.

Illustrative of the last group are the trinitro ring-substituted ortho-haloatroponitriles. These include 2-chloro-3,4,5 - trinitroatroponitrile, 2,6 - dibromo - 3,4,5-trinitroatroponitrile and their beta-halogen substituted counterparts such as beta,2-dichloro-3,4,5-trinitroatroponitrile and the like.

The invention also includes those ortho-haloatroponitriles containing mixed halogen atoms, i.e., when more than one halogen substituent is present in the ortho-haloatroponitrile, they may be different.

The atroponitriles of this invention are active herbicides and/or microbicides, in this latter application having particular effectiveness as fungicides.

While it has been found that atroponitrile and p-chloroatroponitrile possess very slight microbicidal activity, as a practical matter, they cannot be used as biological chemicals because both readily polymerize at room temperature on standing. The resulting polymeric products are essentially microbiologically inactive. Surprisingly, the ortho halogen substituted atroponitriles of the present invention are considerably more stable to polymerization than the above two atroponitriles in addition to having greater microbicidal activity.

DESCRIPTION OF THE PREFERRED EMBODIMENTS

Although the halogen substituents denoted by the symbols W, X, Y and Z in the above formula may be selected from any of the halogens, e.g., fluorine, chlorine, bromine or iodine, the most active atroponitriles are those wherein the symbols denote middle halogen, i.e., chlorine or bromine, and Y is hydrogen. Accordingly, the preferred class of atroponitriles of this invention is that wherein Y is hydrogen and any halogens present in the W, X, Y and Z positions are middle halogen.

Even more preferred because of their high microbicidal activity are those ortho-haloatroponitriles of Formula I in which W is hydrogen or chlorine, X is chlorine, Y is hydrogen, and each Z, which may be the same or different, is hydrogen or chlorine. Of this subclass those substituted by three or more chlorine atoms are most preferred.

Illustrative of those ortho-haloatroponitriles substituted by three chlorine atoms are 2,3,4-trichloroatroponitrile, 2,4,5 - trichloroatroponitrile, beta,2,4 - trichloroatroponitrile, beta,2,5-trichloroatroponitrile and the like.

PREPARATION

The orthohaloatroponitriles of this invention except those containing two ortho halogens, i.e., X and Y are both halogen, may be prepared by dehydration of the corresponding atropamides; the atropamides, in turn, are readily available by hydration-dehydration of the appropriate acetophenone cyanohydrins (alpha-methylmandelonitriles). Such cyanohydrins are derived by the reaction of acetophenones with hydrogen cyanide by known methods.

Exemplary acetophenone precursors are 2'-chloroacetophenone, 2,2'-dibromoacetophenone, 2,2'5'-trichloroacetophenone, 2',3' - dichloroacetophenone, 2,2',4' - trichloroacetophenone, 2',4',5' - trichloroacetophenone, 2,2',4',5'-tetrachloroacetophenone, 2,2',4',5' - tetrabromoacetophenone. 2',4' - dibromo - 3' - nitroacetophenone, 2',3'-dichloro-4',5'-dinitroacetophenone, 2,2'-difluoro-3',4',5'-trinitroacetophenone and the like.

The acetophenones may be prepared by reaction of the appropriate substituted benzene with a haloacetylchloride in the presence of aluminum chloride followed by decomposing the resulting complex with ice and hydrochloric acid. This orthodox Friedel-Crafts ketone synthesis is described in Fieser and Fieser, Organic Chemistry, second edition, 1950 at pp. 576–7.

The cyanohydrins are readily prepared by the liquid phase reaction of the appropriate acetophenone with hydrogen cyanide. The method is described in Fieser and Fieser, Organic Chemistry, second edition, 1950 at pp. 205–6.

The two step conversion of the cyanohydrin to the atroponitriles of this invention may be illustrated thusly:

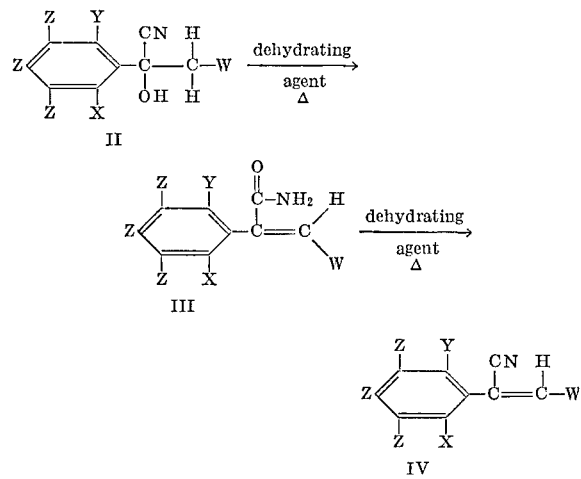

The symbols W, X, and Z have the same meanings as previously described and Y is hydrogen.

The reaction of the cyanohydrin with a dehydrating agent is carried out in the liquid phase. The dehydrating agent used, which usually serves as a reaction medium also, is sulfuric acid of at least 70% of the concentration of $H_2SO_4$ in commercial concentrated sulfuric acid. In most cases, it will be found desirable to use sulfuric acid of at least 80% strength, on the same basis, and in many cases, better results are obtained with concentrated sulfuric acid.

The reaction is carried out at moderately elevated temperatures, i.e., from about 50° C. to about 150° C. The reaction proceeds at a satisfactory rate at temperatures from about 80° C. to about 110° C., a preferred range.

The atropamide product may be isolated by cooling the reaction mixture and separating the amide by filtration or other conventional techniques for the separation of solids from liquids. The amide may then be purified by recrystallization from a suitable solvent, such as carbon tetrachloride. It is not necessary to isolate the amide, however, before converting it to the atroponitrile, i.e., the reaction medium containing the amide may be used directly to form the atroponitrile.

The atropamides are converted to the atroponitriles by the use of suitable dehydrating agents such as thionyl chloride, phosphorous pentoxide, concentrated sulfuric acid, oleum, phosphorous oxychloride, polyphosphoric acid and the like. Thionyl chloride is the preferred dehydration agent.

This reaction is carried out in the liquid phase at temperatures of about 50° C. to about 150° C., preferably at the reflux temperature of the reaction medium. When concentrated sulfuric acid is used, the reaction temperature is generally near the upper end of the 50° C.–150° C. range.

When thionyl chloride is used as the dehydration agent, it is preferred to use an excess to serve as a solvent or reaction medium. At least a 100 percent excess (based upon the theoretical amount required for the dehydration) should be used, and preferably an excess of the order of 150–400 percent is used in order to insure a liquid reaction medium. Temperatures of about 70° C.–95° C. are generally sufficient with thionyl chloride. Inert organic solvents may be used in addition to the thionyl chloride, although they are not needed. When other dehydrating agents are used, inert organic solvents are preferably used. Suitable solvents include the aromatic hydrocarbons, such as benzene, toluene, the xylenes, etc. and their chlorinated counterparts such as chlorobenzene, the dichlorobenzenes, the chlorotoluenes and the like. The character of the particular solvent depends on the dehydrating agent used.

After the dehydration reaction is complete, the atroponitriles, which range from high-boiling liquids to low-melting solids at room temperature, are separated from the reaction medium by conventional techniques such as distillation, filtration, etc.

The 2,6-dihaloatroponitriles and the beta-unsaturated atroponitriles may be prepared by the hydroxymethylation of an appropriate phenylacetonitrile using formaldehyde and a basic catalyst. The intermediate troponitrile formed is then dehydrated during distillation to produce the atroponitrile. The general process is described in U.S. 2,478,990. The precursor substituted phenylacetonitriles are known compounds for the most part. They may be prepared by reacting the appropriate substituted benzyl halide with sodium cyanide in an inert organic solvent at elevated temperatures, e.g., 90°–120° C.

The following examples are illustrative of the methods of preparing the atroponitriles and of their biological activity.

EXAMPLE I

Preparation of alpha-chloromethyl-2,4-dichloromandelonitrile 105 grams (0.47 mole) of 2,2,4'-trichloroacetophenone and approximately 0.5 milliliter of saturated, aqueous potassium cyanide were placed in a flask equipped with a water-cooled dropping funnel and a reflux condenser. 55 milliliters of liquid hydrogen cyanide was added rapidly, producing almost immediate solution of the solid ketone. A mild exothermic reaction occurred and the HCN refluxed gently at 32° C. After about 15 minutes, the reaction subsided, and external heating was provided to maintain reflux at 30–32° C. for 30 minutes longer. The colorless solution was cooled to 25° C. and a few drops of concentrated sulfuric acid was added to stabilize the cyanohydrin. Excess HCN was removed under reduced pressure into a potassium hydroxide trap, the residual cyanohydrin solidifying. The product was triturated with hexane to remove traces of unreacted ketone and dried under vacuum to yield 113 grams of alpha-chloromethyl-2,4-dichloromandelonitrile, melting point: 97–98° C.

Analysis (percent by weight).—Found: C, 42.1; H, 2.5; Cl, 42.9. Calculated: C, 43.1; H, 2.4; Cl, 42.5.

EXAMPLE II

Preparation of beta,2,4-trichloratropamide (isomer melting at 101° C.)

15 grams (0.05 mole) of alpha-chloromethyl-2,4-dichloromandelonitrile was suspended in 100 milliliters of concentrated sulfuric acid and the mixture heated on a steam path, the solid nitrile dissolving rapidly. After 30 minutes at 95° C., the solution was cooled and poured over 500 grams of cracked ice. The colorless solid product was filtered off, and recrystallized from the carbon tetrachloride, yielding 12 grams of beta, 2,4-trichloroatropamide, melting point: 101–102° C.

Analysis (percent by weight).—Found: N, 5.2; Cl, 42.8. Calculated: N, 5.6; Cl, 42.5.

The identity of the product was confirmed by infrared spectral analysis and by nuclear magnetic resonance spectral analysis.

EXAMPLE III

Preparation of beta,2,4-trichloroatroponitrile (both isomers)

A mixture of 78 grams (0.31 mole) of beta,2,4-trichloroatropamide (isomer melting at 101–102° C.), suspended in 132 grams (1.1 moles) of thionyl chloride, was refluxed at 70–95° C. for 27 hours, at which point gas-liquid chromatography indicated the disappearance of the amide and the presence of two isomeric nitriles in approximately equal quantities. The excess thionyl chloride was then stripped off under reduced pressure and the residue distilled to yield two fractions boiling at approximately 130–134° C. at 0.2 torr pressure; these solidified on standing. The two isomeric nitriles were separated by extraction with pentane. The cis isomer—30 grams—was recrystallized from cold pentane; its melting point: 53–56° C. The trans isomer was insoluble in pentane. Recrystallization from hexane gave 24 grams of the trans isomer, melting at 99–100° C.

Anaylsis (percent by weight).—Cis isomer.—Found: Cl, 45.1; N, 5.5. Calculated: Cl, 45.7; N, 6.0. Trans isomer.—Found: Cl, 45.3; N, 6.0. Calculated: Cl, 45.8; N, 6.0.

The structures of the products were confirmed and their configurations ascertained by infrared spectral analysis and by nuclear magnetic resonance spectral analysis.

EXAMPLE IV

Preparation of 2,5-dichloroatropamide 15 grams (0.07 mole) of alpha-methyl-2,5-dichloromandelonitrile was heated with 100 milliliters of 90% sulfuric acid (132 grams of concentrated sulfuric acid diluted to 100 milliliters) at 90° C. for a period of 7 hours. The reaction mixture then was poured over ice. Recrystallization of the crude solid product from benzene, then drying, gave 9.5 grams of 2,5-dichloroatropamide, melting point: 132–133° C.

Analysis (percent by weight).—Found: N, 6.4; Cl, 32.4. Calculated: N, 6.5; Cl, 32.8.

The identity of the product was confirmed by infrared spectral analysis and nuclear magnetic spectral analysis.

EXAMPLE V

Preparation of 2,5-dichloroatroponitrile

This compound was prepared from the 2,5-dichloroatropamide of Example IV, by the procedure described in Example III. The 2,5-dichloroatroponitrile product boiled at 125–131° C. at 0.6 torr pressure. Index of refraction $n_D{}^{27}=1.5769$. Gas-liquid chromatography indicated it to be 94% 2,5-dichloroatroponitrile, identity confirmed by infrared spectral analysis and nuclear magnetic resonance spectral analysis.

Analysis (percent by weight).—Found: N, 7.0; Cl, 36.7. Calculated: N, 7.1; Cl, 35.9.

EXAMPLE VI

Preparation of 2,6-dichloroatroponitrile

A mixture of 32 grams (0.17 mole) of 2,6-dichlorophenylacetonitrile, 17 grams of 37% Formalin and 2 milliliters of Triton B[1] in 35 milliliters of 95% ethanol was heated to reflux for 15 minutes. The homogenous solution was cooled and diluted with 50 milliliters each of water and methylene chloride. Concentration of the organic phase gave an oil which was vacuum-distilled to yield 2,6-dichloroatroponitrile (7 grams, 21% yield) as a colorless product boiling at 90° C. at 0.05 torr pressure.

Analysis (percent by weight).—Found: N, 6.8; Cl, 35.5. Calculated: N, 7.1; Cl, 35.8.

EXAMPLE VII

Preparation of other atroponitriles

Using the methods of Examples I–VI, the following atroponitriles were prepared.

| Atroponitrile | Melting point (° C.) or Boiling point (° C. at torr pressure) | Analysis (percent by weight) | | | |
|---|---|---|---|---|---|
| | | Calculated | | Found | |
| | | N | Cl | N | Cl |
| 2-chloroatroponitrile | 67 at 0.05 torr | 8.6 | 21.7 | 8.5 | 21.7 |
| 2,4-dichloroatroponitrile | 59–60 | 7.1 | 35.8 | 7.4 | 35.7 |
| 2,4,5-trichloroatroponitrile | 60–62 | 6.0 | 45.8 | 6.0 | 46.2 |
| 2,3,5-trichloroatroponitrile | 86–88 | 6.0 | 45.8 | 6.3 | 45.6 |
| 2,4-dichloro-5-nitro-atroponitrile | 89–92 | 11.5 | 29.2 | 11.6 | 29.0 |
| Beta, 2,5-trichloroatroponitrile | 50–52 | 6.0 | 45.8 | 6.3 | 45.6 |

EXAMPLE VIII

Herbicidal activity of the atroponitriles

Pre-emergence herbicidal activity was evaluated by planting weed seeds in soil treated with the test compounds at the rate of 10 pounds per acre. Seeds of watergrass (Echinochloa crusgalli) and cress (Lepidium sativum) were germinated in treated soil under controlled conditions of temperature and light for 10 to 11 days prior to evaluation of the effectiveness of the treatments. At this time, the germination was noted and the treatments were rated on a 0 (no effect) to 9 (all dead) scale. The results are summarized in Table I.

Post-emergence herbicidal activity was evaluated by spraying dilute suspensions of the compounds in a 1:1 mixture of acetone and water with 0.5% wetting agent on crabgrass (Digitari sangunialis) and pigweed plants (Amaranthus sp.) grown under controlled conditions. After the plants were held for 10 to 11 days, they were rated for treatment effect on a 0 (no effect) to 9 (total plant kill) scale. The results are set forth in Table I.

TABLE I

| Atroponitrile | Pre-emergence | | Post-emergence | |
|---|---|---|---|---|
| | Water-grass | Cress | Crab-grass | Pig-weed |
| 2-chloroatroponitrile | 7 | 9 | 9 | 9 |
| 2,5-dichloroatroponitrile | 8 | 9 | 8 | 9 |
| 2,4-dichloroatroponitrile | 9 | 8 | 9 | 9 |
| 2,6-dichloroatroponitrile | 6 | 9 | 9 | 9 |
| 2,4,5-trichloroatroponitrile | 6 | 7 | 5 | 8 |
| 2,3,5-trichloroatroponitrile | 8 | 9 | 8 | 9 |
| beta,2,5-trichloroatroponitrile | 7 | 9 | 6 | 9 |
| beta,2,4-trichloroatroponitrile (cis) | 7 | 8 | 9 | 9 |
| beta,2,4-trichloroatroponitrile (trans) | 0 | 0 | 1 | 9 |
| 2,4-dichloro-5-nitroatroponitrile | 7 | 7 | 7 | 9 |

[1] 40% solution of benzyltrimethylammonium hydroxide in ethyl alcohol.

From these data, it is evident that atroponitriles of this invention are general herbicides which may be used for either pre-emergent or post-emergent applications, the effective dosages being 10 pounds per acre or somewhat less.

Atroponitriles of this invention also exhibited activity with respect to a variety of microorganisms. Thus, at a concentration of 128 p.p.m. test material it was found that 2,4 - dichloroatroponitrile, 2,3,4 - trichloroatroponitrile, 2,4,5 - trichloroatroponitrile, β,2,4 - trichloroatroponitrile (trans isomer), β,2,5-trichloroatroponitrile, 4-bromo-β,2-dichloroatroponitrile and 2,4-dichloro-5-nitroatroponitrile inhibited the growth of such gram-positive bacteria as various strains of *Staphylococcus aureus, Bacillus subtilis, Listeria monocytogenes*, strains of *Streptococcus pyogenes;* such acid-fast bacteria as *Erwinia carotovora*.

At a concentration of 4 p.p.m., the above compounds also were found to inhibit the growth of fungi such as *Aspergillus niger, Aspergillus tamarii, Chaetomium globosum, Cladosporium resinae, Epidermophyton fluccusum, Fusarium moniliforme, Hormodendrum sp., Memnoniella echinata, Microsporum gypseum, Penicillium citrinum, Penicillium italicum, Polyperus tulipiferus, Poria monticola, Sclerotium rolfsii,* Trichroderma sp., *Trichophyton mentagrophytes, Candida albicans, Candida mycoderma,* and *Saccharomyces cerevisiae*.

As previously indicated, p-chloroatroponitrile dimerizes on standing at room temperature. In comparative tests, this dimer failed to inhibit the growth of any of a wide variety of microorganisms tested. The conditions of the test were the same as those used for the orthohaloatroponitriles of this invention except that the p-chloroatroponitrile dimer was tested at a concentration of 32 p.p.m. The test organisms were *Staphylococcus aureus, Escherichia coli, Proteus vulgaris, Bacillus subtilis, Corynebacterium equi, Candida albicans, Erwinia carotovora, Mycobacterium avium, Aspergillus niger* and *Penicillium citrinum*.

I claim as my invention:

1. An ortho-haloatroponitrile having the formula

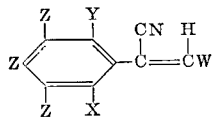

wherein W is hydrogen or halogen, X is halogen, Y is hydrogen or halogen, and each Z is hydrogen, halogen or nitro with the proviso that when Y is halogen, W is hydrogen.

2. An ortho-haloatroponitrile of claim 1 wherein W is hydrogen, chlorine or bromine, X is chlorine or bromine, Y is hydrogen chlorine or bromine, and each Z is hydrogen, chlorine, bromine or nitro.

3. An ortho-haloatroponitrile of claim 2 wherein Y is hydrogen.

4. An ortho-haloatroponitrile of claim 1 wherein W is hydrogen or chlorine, X is chlorine, Y is hydrogen, and each Z is hydrogen or chlorine.

5. β,2,5-trichloroatroponitrile.
6. 2,4,5-trichloroatroponitrile.
7. 2,3,4-trichloroatroponitrile.
8. β,2,4-trichloroatroponitrile.
9. 2,5-dichloroatroponitrile.
10. An ortho-haloatroponitrile having the formula

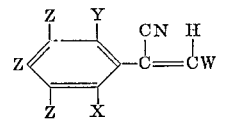

wherein W is hydrogen or chlorine, X is chlorine, Y is hydrogen, and each Z is hydrogen or chlorine with the proviso that the atroponitrile is substituted with at least three chlorine atoms.

References Cited
UNITED STATES PATENTS 2,444,870   7/1948   Clifford.
3,331,865   7/1967   Weil et al. _____ 260—465

CHARLES B. PARKER, Primary Examiner

D. H. TORRENCE, Assistant Examiner

U.S. Cl. X.R.

71—105; 260—558; 424—304